(12) United States Patent
Kim et al.

(10) Patent No.: US 9,003,675 B2
(45) Date of Patent: Apr. 14, 2015

(54) FUEL PREPROCESS SYSTEM FOR COAL COMBUSTION BOILER

(75) Inventors: Dong-Won Kim, Daejeon (KR);
Jong-Min Lee, Daejeon (KR);
Young-Joo Kim, Daejeon (KR);
Jae-Sung Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 965 days.

(21) Appl. No.: 13/090,891

(22) Filed: Apr. 20, 2011

(65) Prior Publication Data
US 2011/0265734 A1   Nov. 3, 2011

(30) Foreign Application Priority Data
Apr. 28, 2010   (KR) .................. 10-2010-0039730

(51) Int. Cl.
| F26B 19/00 | (2006.01) |
| F23G 5/04 | (2006.01) |
| F23G 5/027 | (2006.01) |
| F23G 5/50 | (2006.01) |
| F23G 7/10 | (2006.01) |
| F26B 3/08 | (2006.01) |

(52) U.S. Cl.
CPC ............... *F23G 5/04* (2013.01); *F23G 5/0276* (2013.01); *F23G 5/50* (2013.01); *F23G 7/10* (2013.01); *F23G 2201/303* (2013.01); *F23G 2201/50* (2013.01); *F23G 2201/60* (2013.01); *F23G 2206/10* (2013.01); *F23L 2900/15043* (2013.01); *F26B 3/08* (2013.01); *F26B 2200/02* (2013.01)

(58) Field of Classification Search
CPC ......... Y02E 50/10; Y02E 50/14; Y02E 50/15; Y02E 50/30; F23G 5/0276; F23G 5/04; F23G 5/50; F23G 7/10; F23G 2201/303; F23G 2201/60; F23G 2201/50; F23G 2206/10; F23L 2900/15043; F23L 9/04; C10B 49/02; F26B 3/08; F26B 2200/02
USPC ........ 34/201, 386, 427, 61; 60/651, 671, 648, 60/649; 95/134, 139, 149, 151, 90; 96/108, 143, 146; 110/346, 202, 213, 110/218, 342, 232, 255, 261, 224, 229, 110/243–245; 290/1 R; 44/605, 307, 589, 44/300, 457, 505, 550, 629, 641; 585/16, 585/240, 469, 501, 510, 700, 701
See application file for complete search history.

(56) References Cited

U.S. PATENT DOCUMENTS

| 4,530,169 | A | * | 7/1985 | Okawara .......................... 34/582 |
| 5,419,267 | A | * | 5/1995 | Raiko ............................ 110/245 |
| 8,444,721 | B2 | * | 5/2013 | Bai ................................ 44/605 |
| 8,449,724 | B2 | * | 5/2013 | Stromberg et al. ............. 202/96 |
| 2008/0201980 | A1 | * | 8/2008 | Bullinger et al. ............... 34/493 |
| 2010/0228062 | A1 | * | 9/2010 | Babicki et al. ................ 585/240 |
| 2011/0176968 | A1 | * | 7/2011 | Fan et al. ....................... 422/139 |
| 2011/0179700 | A1 | * | 7/2011 | Monroe et al. .................. 44/589 |
| 2012/0056431 | A1 | * | 3/2012 | Bland et al. ..................... 290/52 |

* cited by examiner

*Primary Examiner* — Kenneth Rinehart
*Assistant Examiner* — Bao D Nguyen
(74) *Attorney, Agent, or Firm* — McDermott Will & Emery LLP

(57) ABSTRACT

A fuel preprocess system for a coal combustion boiler is disclosed. The fuel preprocess system for a coal combustion boiler that dries biomass or refuse-derived fuel in accordance with the present invention can include: a dryer configured to dry the biomass or refuse-derived fuel by use of flue gas generated after combustion in the boiler; and a torrefier configured to devolatilize a fibrous component contained in the dried fuel from the fuel dried in the dryer by use of primary air that is heat-exchanged after the combustion in the boiler.

5 Claims, 5 Drawing Sheets

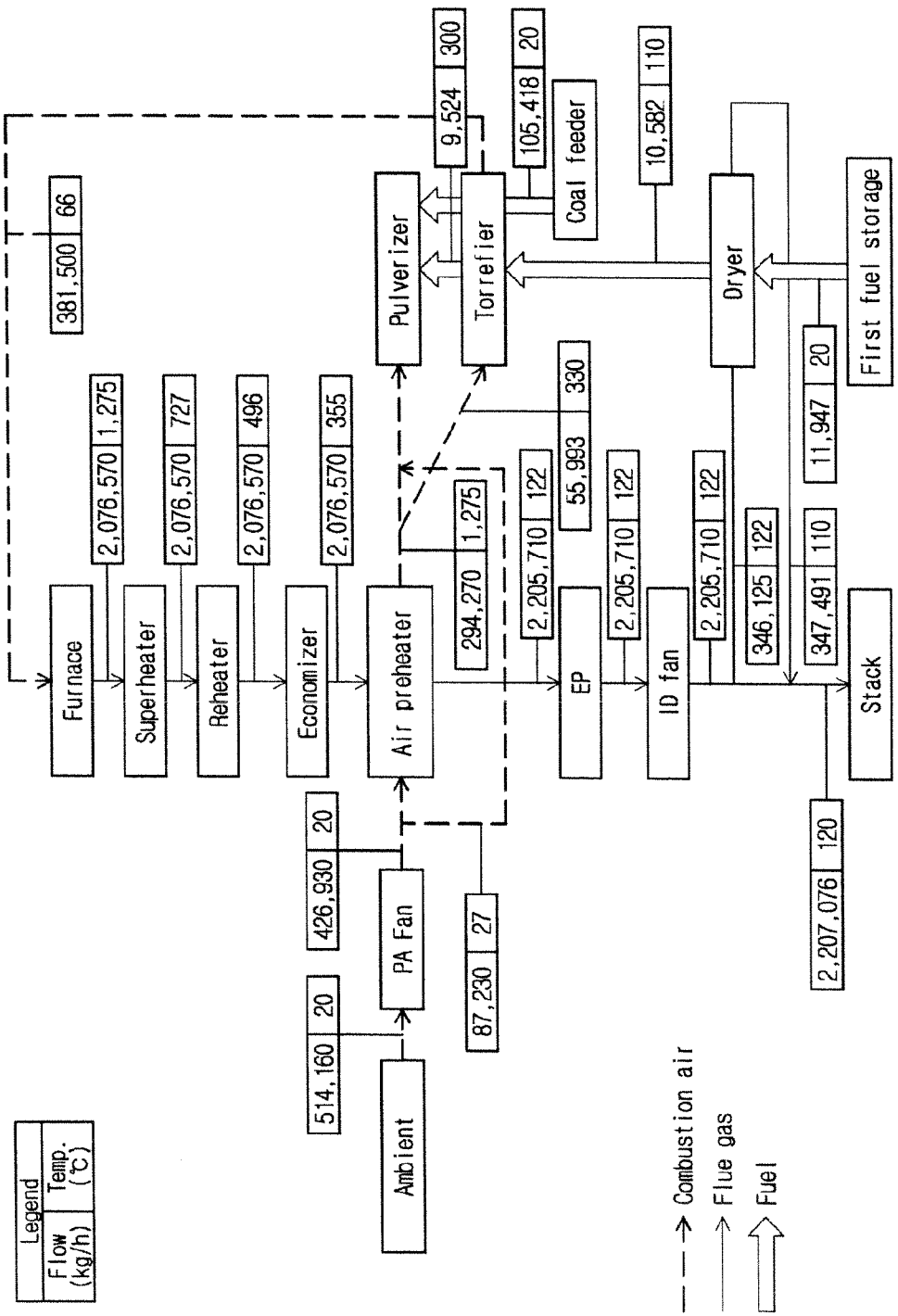

FUEL PREPROCESS SYSTEM FOR COAL COMBUSTION BOILER

CROSS-REFERENCE TO RELATED APPLICATIONS

This application claims the benefit of Korean Patent Application No. 10-2010-0039730, filed with the Korean Intellectual Property Office on Apr. 28, 2010, the disclosure of which is incorporated herein by reference in its entirety.

BACKGROUND

1. Technical Field

The present invention is related to a fuel preprocess system for coal combustion boiler.

2. Background Art

In general, biomass or refuse-derived fuel is mainly used in a fluidized bed combustor and a stoker incinerator, which are relatively little affected by the size of fuel particles and the phase change, and is used to produce steam and electricity by use of the generated heat. These boilers, however, have relatively low reaction temperatures and thus have a relatively lower conversion than coal combustion boilers, and have a low boiler efficiency because of their small capacities.

Accordingly, there have been a number of efforts to burn the biomass or refuse-derived fuel in the coal combustion boiler. However, in order to burn the above kinds of fuel completely or mixed with another kind of fuel in the conventional coal combustion boiler without replacing the pulverizer or burner, not only does the fuel supply equipment (transfer and storage equipment) need to be drastically modified, but the conventional pulverizer needs to be overdriven, thereby lowering the stability of the entire facility. Therefore, pulverizers and burners for biomass and refuse-derived fuel have been newly developed. However, in applying a new pulverizer, a preprocess, such as drying, is needed in case the fuel contains a large amount of hemi-cellulose or moisture, making it difficult to apply the conventional system.

SUMMARY

The present invention provides a fuel preprocess system for coal combustion boiler that extracts primary air or flue gas of the boiler and uses the primary air or flue gas in a process of drying biomass or refuse-derived fuel.

The present invention provides a fuel preprocess system for coal combustion boiler that can reuse the primary air used in the drying process in the combustion of the boiler.

An aspect of the present invention features a fuel preprocess system for a coal combustion boiler that dries biomass or refuse-derived fuel. The fuel preprocess system in accordance with an embodiment of the present invention can include: a dryer configured to dry the biomass or refuse-derived fuel by use of flue gas generated after combustion in the boiler; and a torrefier configured to devolatilize a fibrous component contained in the dried fuel from the fuel dried in the dryer by use of primary air that is heat-exchanged after the combustion in the boiler.

The temperature of the primary air used in the torrefier can be higher than the temperature of the flue gas used for drying in the dryer.

The dryer can use the flue gas that does not contain ashes as a heat source, and the flue gas used for drying in the dryer can be discharged to the air by being injected to a flue gas duct of a coal combustion boiler system.

The primary air used as the heat source in the torrefier can be used as combustion air of the boiler by being injected to a coal combustion burner included in the boiler.

The dryer further can also include a fluidized bed dryer.

The dryer can be a circulating fluidized bed dryer or a bubble fluidized bed dryer.

The fuel preprocess system for a coal combustion boiler can also include a first cyclone configured to separate the dried fuel into flue gas and fuel, in case the circulating fluidized bed dryer is used as the dryer.

The fuel preprocess system for a coal combustion boiler can also include a first loop chamber placed between the first cyclone and the torrefier and configured to temporarily store the fuel separated from the first cyclone and to supply the fuel to the torrefier.

The fuel preprocess system for a coal combustion boiler can also include a second loop chamber placed between the dryer and the torrefier and configured to temporarily store the fuel dried in the dryer and to supply the fuel to the torrefier.

The torrefier can be a circulating fluidized bed dryer or a bubble fluidized bed dryer.

The fuel preprocess system for a coal combustion boiler can also include a fuel storage configured to store the fuel from which the fibrous component is devolatilized in the torrefier through a torrefaction process.

The fuel preprocess system for a coal combustion boiler can also include a second cyclone configured to separate the fuel from which the fibrous component is devolatilized through the torrefaction process into flue gas and fuel, in case the circulating fluidized bed dryer is used as the torrefier.

The fuel preprocess system for a coal combustion boiler can also include a third loop chamber placed between the torrefier and the fuel storage and configured to temporarily store the fuel separated from the second cyclone and then supply the fuel to the fuel storage.

The fuel preprocess system for a coal combustion boiler can also include a fourth loop chamber placed between the torrefier and the fuel storage and configured to temporarily store the fuel that is torrefaction-processed in the torrefier and then supply the fuel to the fuel storage, in case the bubble fluidized bed dryer is used as the torrefier.

BRIEF DESCRIPTION OF THE DRAWINGS

FIG. 5 shows the temperatures and flow amounts based on the flow of combustion air and flue gas when a dryer and a torrefier are added in MGR design operation data of a 500 MW standard thermal power boiler.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain technology is determined to evade the point of the present invention, the pertinent detailed description will be omitted. Terms such as "first" and "second" can be used in describing various elements, but the above elements shall not be restricted to the above terms. The above terms are used only to distinguish one element from the other.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, a system and a method for preprocessing fuel for a coal combustion boiler in accordance with some embodiments of the present invention will be described with reference to the accompanying drawings.

Figure 1:
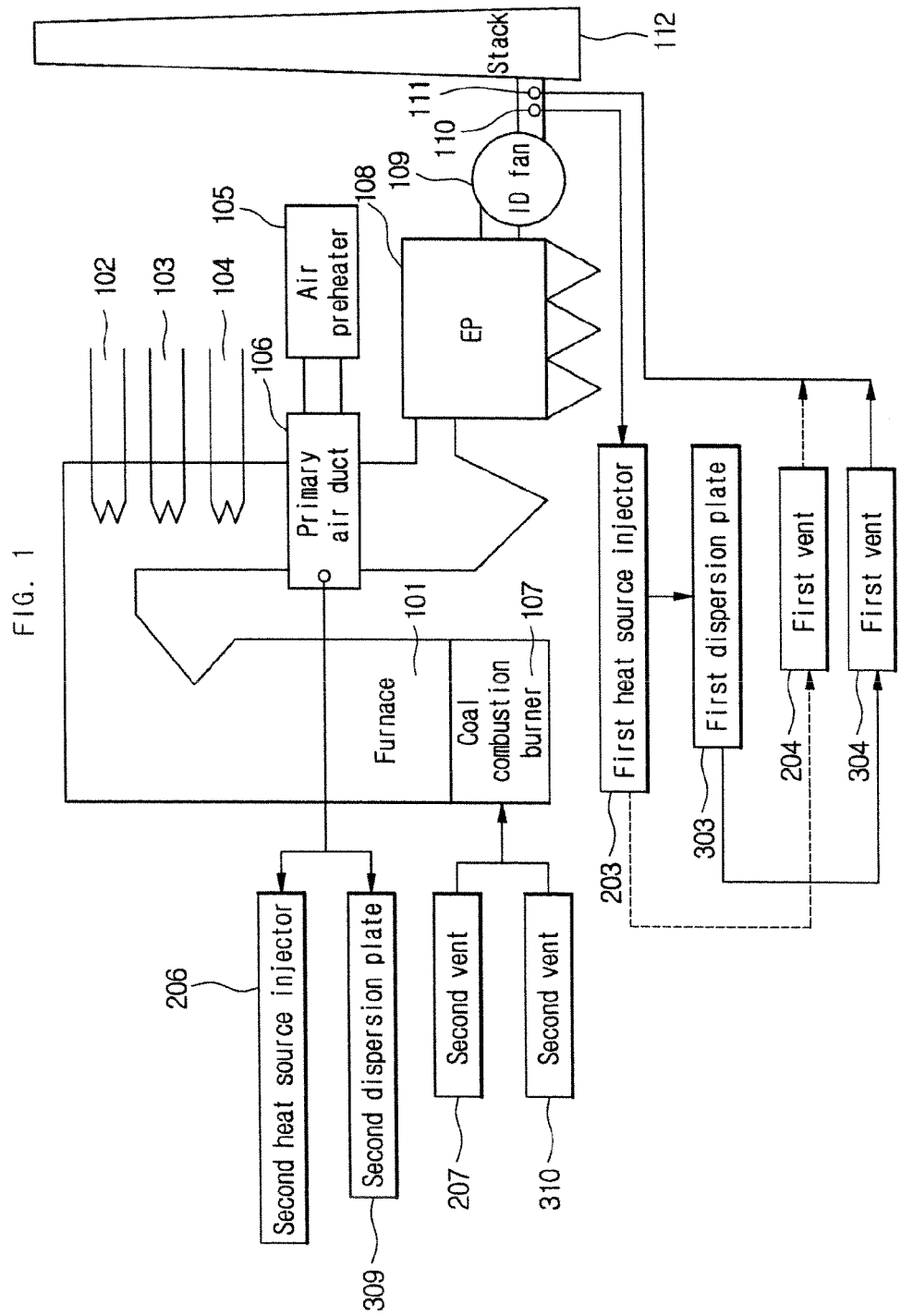
FIG. 1 is a block diagram showing the locations of extracting and re-injecting a heat source needed for a fuel preprocess system in accordance with an embodiment of the present invention.

FIG. 1 is a block diagram showing the locations of extracting and re-injecting a heat source needed for a fuel preprocess system of a coal combustion boiler.

As illustrated in FIG. 1, the coal combustion boiler can include a furnace 101, a coal combustion burner 107, a superheater 102, a reheater 103, an economizer 104, an air preheater 105, a primary air duct 106, an electric precipitator (EP) 108, an induced draft (ID) fan 109, a flue gas extraction duct 110 and a flue gas re-injection duct 111.

Specifically, the furnace 101 burns biomass or refuse-derived fuel that is dried through a drying process or a torrefaction process of the preprocess system.

A heat exchanger can be constituted by the superheater 102, the reheater 103, the economizer 104 and the air preheater 105, and is used for heat exchange of flue gas generated from the furnace 101. The EP 108 removes ashes that are in the flue gas.

Here, the flue gas used as the heat source of the drying process of biomass or refuse-derived fuel is extracted at the flue gas extraction duct 110, which is located at the rear end of the ID fan 109, re-injected to the flue gas re-injection duct 111 through a first vent 204 or 304, and discharged to the air through a stack 112.

The primary air that is used as the heat source of the torrefaction process of the dried biomass or refuse-derived fuel is extracted at the primary air duct 106 and injected to the coal combustion burner 107 through a second vent 207 or 310 after the torrefaction process to be used as combustion air.

Here, since the flue gas used in the drying process should not contain ashes and should have positive pressure, the flue gas is used at the rear end of the ID fan 109. Moreover, since the combustion air used in the torrefaction process should not contain any ashes of 300 degrees or higher, primary air that is heat-exchanged at the air preheater 105 is used.

Hitherto, injecting and discharging of the flue gas used in the preprocess of biomass and refuse-derived fuel for a coal combustion boiler has been described. Hereinafter, using the flue gas and reusing the flue gas discharged after the drying process or torrefaction process will be described.

Figure 2:
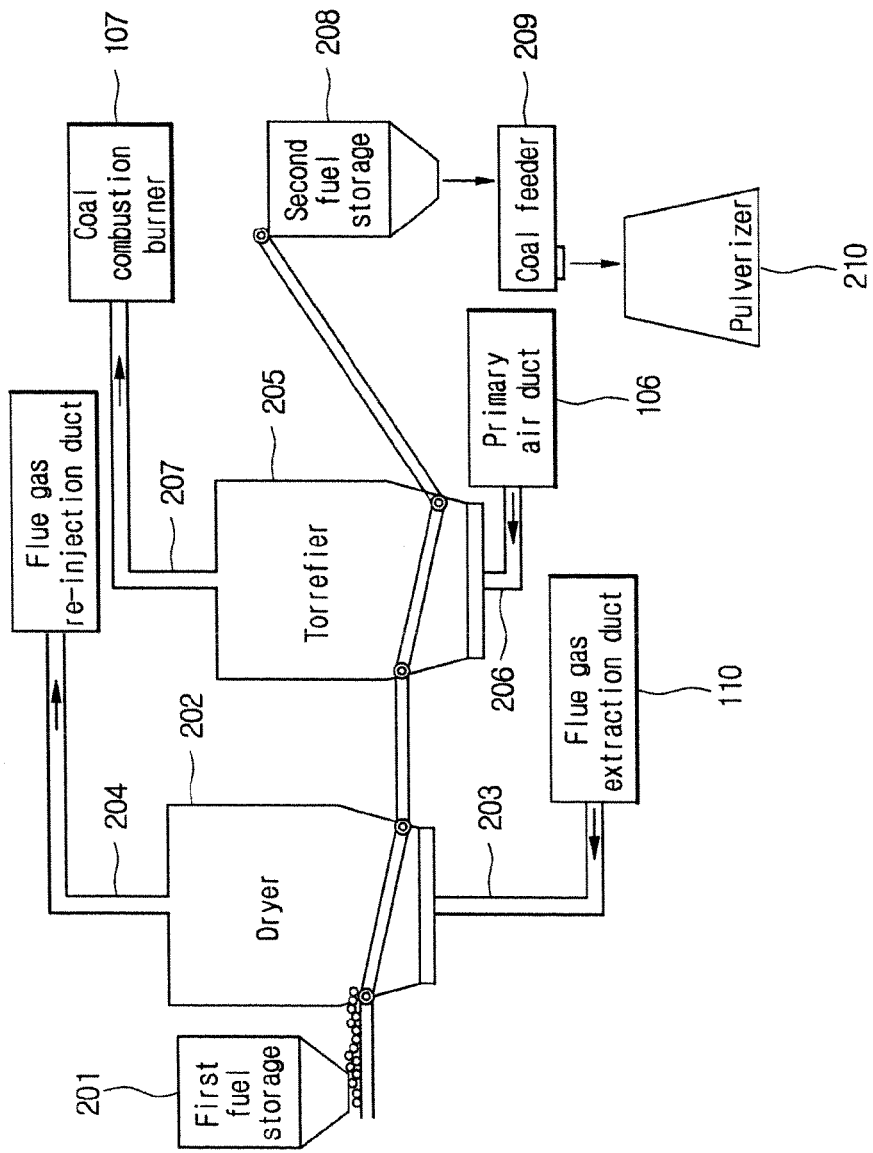
FIG. 2 is a block diagram illustrating a biomass and refuse-derived fuel preprocess system for a coal combustion boiler using a stoker type of conveyer belt.

FIG. 2 is a diagram illustrating a fuel preprocess system for a coal combustion boiler in accordance with a first embodiment of the present invention.

Referring to FIG. 2, the fuel preprocess system for a coal combustion boiler in accordance with a first embodiment of the present invention can include a first fuel storage 201, a dryer 202, a first heat source injector 203, a first vent 204, a torrefier 205, a second heat source injector 206, a second vent 207 and a second fuel storage 208.

Specifically, biomass or refuse-derived fuel can be stored in the first fuel storage 201.

The dryer 202 dries the biomass or refuse-derived fuel supplied by the first fuel storage 201. The dryer 202 performs a drying process by using the flue gas supplied by the flue gas extraction duct 110 at the rear end of the ID fan 109 shown in FIG. 1. Here, the dryer 202 can additionally include the first heat source injector 203.

The first heat source injector 203 can evenly supply the flue gas supplied from the flue gas extraction duct 110 to the dryer 202. Here the flue gas supplied through the flue gas extraction duct 110 has the temperature of between 120° C. and 130° C.

The flue gas used for drying in the dryer 202 is discharged through the first vent 204. Here, the first vent is connected to the flue gas re-injection duct 111, which is placed at the rear end of the ID fan 109 shown in FIG. 1, and the flue gas is discharged to the outside through the stack 112.

The biomass or refuse-derived fuel dried in the dryer 202 can be transferred to the torrefier 205 through transportation means such as a conveyer belt.

The torrefier 205 volatilizes the fibrous component (e.g., hemi-cellulose) contained in the biomass or refuse-derived fuel dried in the dryer 201 through the torrefaction process. The torrefier 205 can devolatilizes the fibrous component of the biomass or refuse-derived fuel by use of high-temperature primary air.

The torrefier 205 devolatilizes the fibrous component contained in the biomass or refuse-derived fuel by being supplied with some of the primary air that is heat-exchanged in the air preheater 105 illustrated in FIG. 1. The torrefier 205 can additionally include the second heat source injector 206.

The second heat source injector 206 can evenly supply the primary air of between 300° C. and 320° C. that is supplied from the air preheater 105 to the inside of the torrefier 205.

The air used in the torrefaction process in the torrefier 205 is supplied to the coal combustion burner 107 of the furnace through the second vent 207 and thus can be reused as the combustion air in the boiler.

The fuel finished with drying in the torrefier 205 is supplied to the second fuel storage 208 through transportation means such as a conveyer belt. The fuel supplied to the second fuel storage 208 is supplied to the pulverizer 210 through the coal feeder 209 for pulverization and supply to the furnace 101 shown in FIG. 1.

The fuel preprocess system for a coal combustion boiler in accordance with the first embodiment of the present invention can use the flue gas generated by the combustion boiler for drying, use the primary air heat-exchanged in the air preheater for the torrefaction process, discharge the flue gas used in the drying to the air through the stack, and resupply the air generated after the torrefaction process to the boiler.

Figure 3:
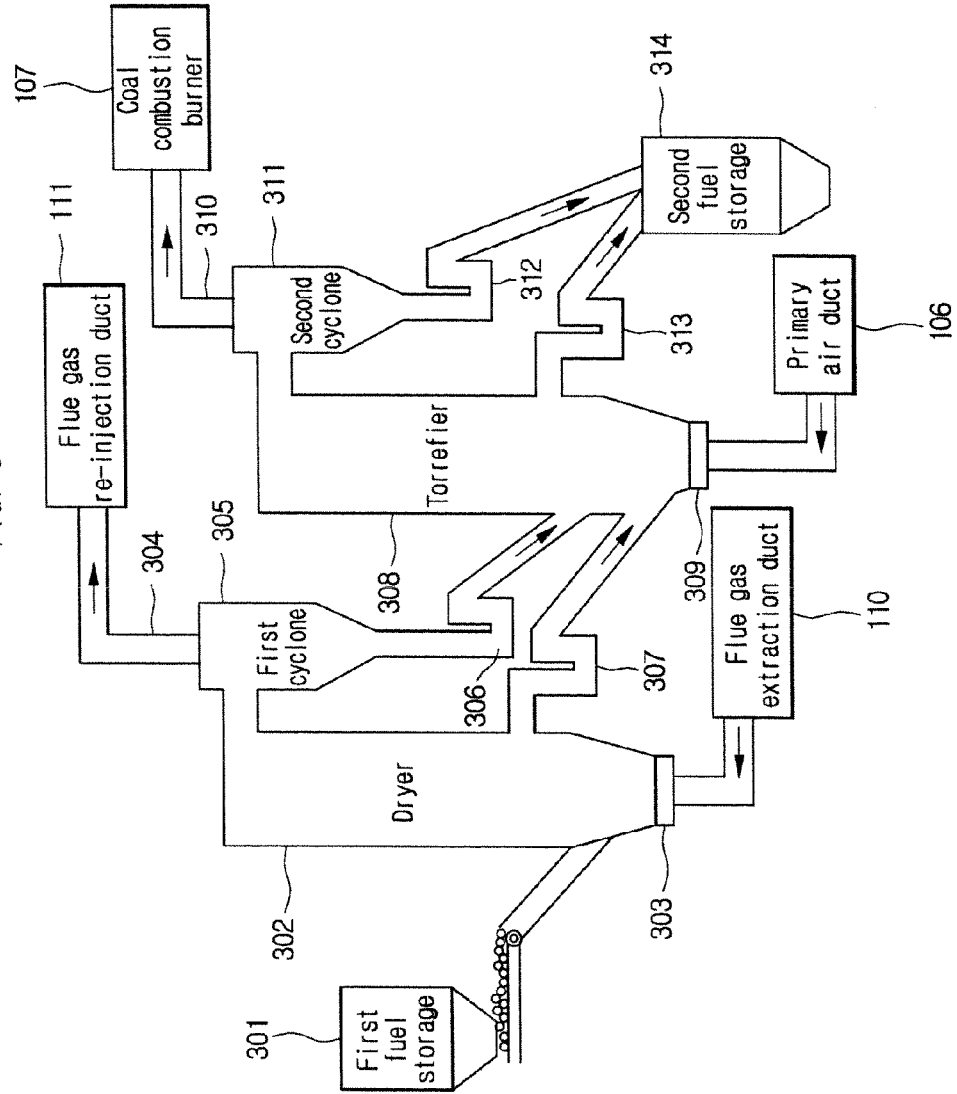
FIG. 3 is a block diagram illustrating a biomass and refuse-derived fuel preprocess system for a coal combustion boiler using a fluidized bed.

FIG. 3 is a block diagram illustrating a fuel preprocess system for a coal combustion boiler in accordance with a second embodiment of the present invention.

Referring to FIG. 3, the fuel preprocess system for a coal combustion boiler in accordance with a second embodiment of the present invention can include a first fuel storage 301, a dryer 302, a first dispersion plate 303, a first cyclone 305, a first vent 304, a torrefier 308, a second dispersion plate 309, first to fourth loop chambers 306, 307,312, 313, a second cyclone 311, a second vent 310 and a second fuel storage 314.

Specifically, biomass or refuse-derived fuel can be stored in the first fuel storage 301.

The biomass or refuse-derived fuel stored in the first fuel storage 301 is supplied to the dryer by transportation means such as a conveyer belt.

The dryer 302 is a fluidized bed dryer that dries the biomass or refuse-derived fuel by flow mixing the biomass or refuse-derived fuel. In order to dry the biomass or refuse-derived fuel, the dryer 302 uses flue gas of between 120° C. and 130° C. that is supplied from the flue gas extraction duct 110 at the rear end of the ID fan 109 shown in FIG. 1.

The dryer 302 can include the first dispersion plate 303.

The first dispersion plate 303 can evenly supply the flue gas supplied from the flue gas extraction duct 110 to the dryer 302.

The biomass or refuse-derived fuel dried in the dryer 302 is collected through the first cyclone 305 and supplied to the torrefier 308 through the first loop chamber 306.

Moreover, the biomass or refuse-derived fuel dried in the dryer 302 can be supplied to the torrefier 308 through the second loop chamber 307.

For example, in case the dryer 302 is a circulating fluidized bed dryer, fuel that is dried by the first cyclone 305 is supplied. The first cyclone 305 separates the dried biomass or refuse-derived fuel supplied by the centrifugal force generated by vortex from gas. The separated dried biomass or refuse-derived fuel is temporarily stored in the first loop chamber 306 and then supplied to the torrefier 308.

In case the dryer 302 is a bubble fluidized bed dryer, the dried biomass or refuse-derived fuel is supplied to the second loop chamber 307, temporarily stored in the second loop chamber 307 and then supplied to the torrefier 308.

The gas discharged from the dryer 302 is supplied to the flue gas re-injection duct 111 shown in FIG. 1 through the first vent 304 and discharged to the outside through the stack 112.

The torrefier 308 performs the torrefaction process of the dried biomass or refuse-derived fuel by use of the primary air of the temperature of between 300° C. and 320° C. that is heat-exchanged in the air preheater 105 shown in FIG. 1. The torrefier 308 can devolatilize the fibrous component of the biomass or refuse-derived fuel by use of the high-temperature primary air. Here, the torrefier 308 can additionally include the second dispersion plate 309.

The second dispersion plate 309 evenly supplies the primary air supplied from the air preheater 105 to the inside of the torrefier 308.

The fuel that is torrefaction processed in the torrefier 308 can be supplied to the second fuel storage 314 through the second cyclone 311 and the second loop chamber 312.

Moreover, the fuel that is torrefaction processed in the torrefier 308 can be supplied to the second fuel storage 314 through the fourth loop chamber 313.

For example, in case the torrefier 308 is a circulating fluidized bed dryer, fuel from which the fibrous component is devolatilized is supplied to the second cyclone 311. The second cyclone 311 separates the fibrous-component-devolatilized biomass or refuse-derived fuel that is supplied by the centrifugal force generated by vortex from gas. The torrefaction-processed biomass or refuse-derived fuel that is separated in the second cyclone 311 is temporarily stored in the third loop chamber 312 and then supplied to the second fuel storage 314.

Moreover, in case the torrefier 308 is a bubble fluidized bed dryer, the biomass or refuse-derived fuel is supplied to the fourth loop chamber 313 after the torrefaction process, and the biomass or refuse-derived fuel from which the fibrous component is devolatilized is temporarily stored in the fourth loop chamber 313 and then supplied to the second fuel storage 314.

The air used for drying in the torrefier 308 is supplied to the coal combustion burner 107 of the furnace 101 through the second vent 310 and thus can be reused as the combustion air in the boiler.

Figure 4:
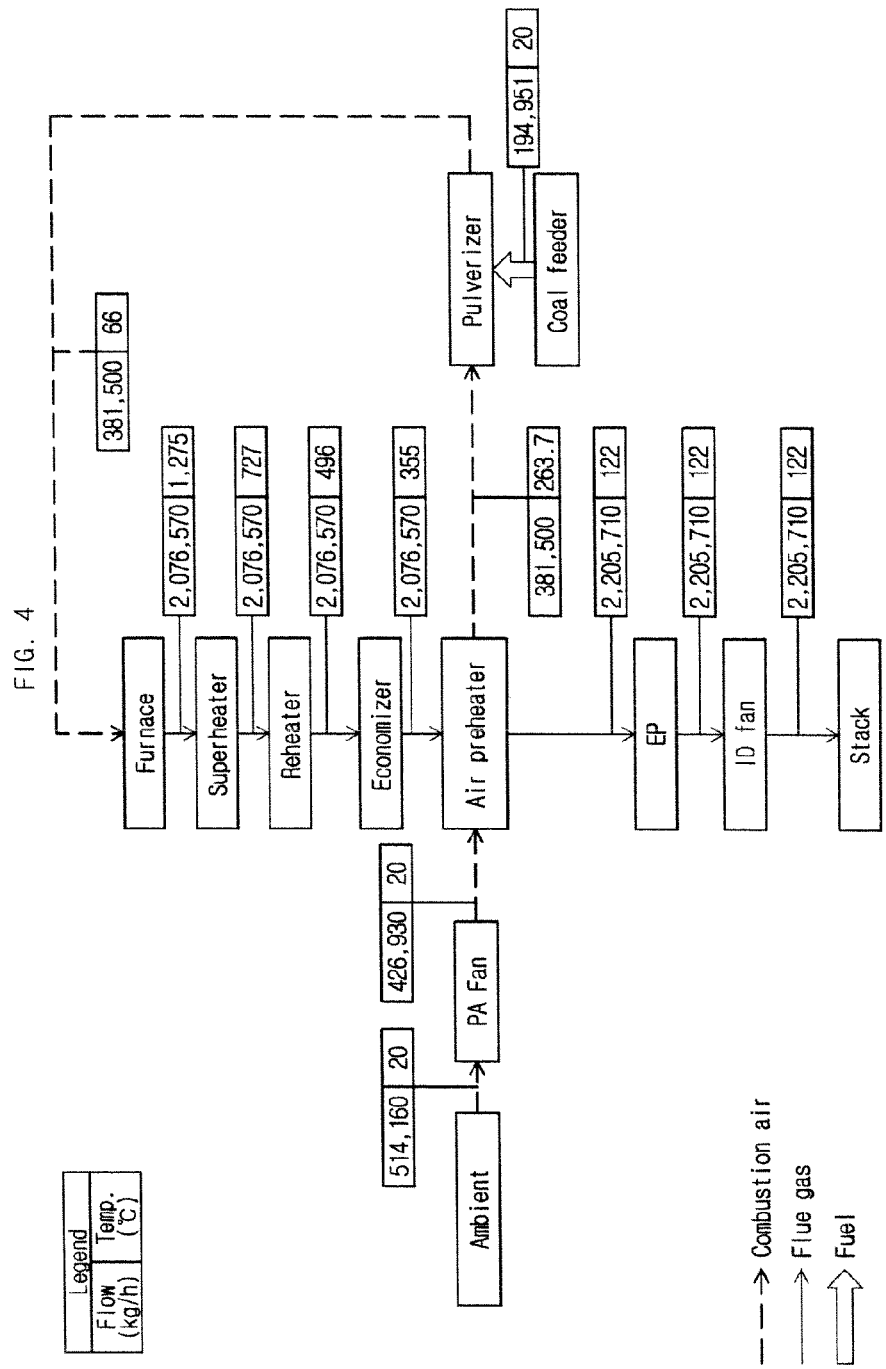
FIG. 4 shows the temperatures and flow amounts based on the flow of combustion air and flue gas in MGR design operation data of a 500 MW standard thermal power boiler.

FIG. 4 shows the temperatures and flow amounts based on the flow of combustion air and flue gas in MGR design operation data of a 500 MW standard thermal power boiler, and FIG. 5 shows the temperatures and flow amounts based on the flow of combustion air and flue gas when a dryer and a torrefier are added in MGR design operation data of a 500 MW standard thermal power boiler.

Referring to FIGS. 4 and 5, the outlet temperatures of air and flue gas are determined by the amount of preprocessed biomass or refuse-derived fuel, and the displayed temperatures and flow amounts are for the case of 5% mixed burning of the wood chip biomass.

It is assumed that the efficiencies of the dryer and torrefier and the efficiency of heat exchange used in FIGS. 4 and 5 are 100%. The qualities of the biomass used are as shown in Table 1.

TABLE 1

| Description | Unit | Wood chip |
| --- | --- | --- |
| Proximate Analysis (As received basis) | | |
| Volatile Matter | % (m/m) | 71.93 |
| Moisture | % (m/m) | 11.43 |
| Fixed Carbon | % (m/m) | 16.25 |
| Ash | % (m/m) | 0.39 |
| Calorific Value (gross as received basis) | Kcal/kg | 4,644 |
| Ultimate Analysis (As dry basis) | | |
| Carbon | % (m/m) | 51.40 |
| Hydrogen | % (m/m) | 6.18 |
| Nitrogen | % (m/m) | 0.02 |
| Total sulfur | % (m/m) | 0.26 |
| Oxygen | % (m/m) | 41.69 |
| Ash | % (m/m) | 0.45 |
| Ash Fusion Temp. (Oxidizing atmosphere) | | |
| I.D.T | ° C. | 1,137 |
| Ash Analysis | | |
| SiO2 | % (m/m) | 7.58 |
| Al2O3 | % (m/m) | 3.08 |
| TiO2 | % (m/m) | 0.16 |
| Fe2O3 | % (m/m) | 6.17 |
| CaO | % (m/m) | 47.71 |
| MgO | % (m/m) | 3.73 |
| Na2O | % (m/m) | 0.83 |
| K2O | % (m/m) | 7.52 |
| SO3 | % (m/m) | 13.78 |
| P2O5 | % (m/m) | 3.48 |
| Cr2O3, MnO, etc. | % (m/m) | 4.40 |

As a result of the calculation, it can be compared and confirmed that there is no loss of heat amount by the torrefier when 5%-mixed biomass is burned. This is because the volatile gas generated in the second drying process and the second dried fuel are both injected into the boiler with the primary air, making no entrance or exit of heat and no increase or decrease of energy.

In the case of drying process, the flue gas is used as the heat source for vaporizing the moisture in the biomass, and thus the temperature of the flue gas discharged to the stack is lower than the conventional way, thereby increasing the efficiency of the overall system.

In addition, as shown in FIGS. 4 and 5, it can be seen that the temperature of the flue gas discharged to the stack is decreased by about 2.24 degrees when the 5%-mixed biomass is burned. Through this, the boiler efficiency is improved by about 0.11%.

As described above, if the mixed ratio of biomass is appropriately adjusted, it can be seen that about 20%-mixed biomass can be burned when the temperature of the stack is limited to 110 degrees. In this case, the boiler efficiency can be increased by 0.44%. Moreover, the fuel preprocess system for a coal combustion boiler in accordance with the first and second embodiments of the present invention has no change in the amount and temperature of the flue gas in the entire coal combustion boiler and thus can be applied without adjusting the boiler heat distribution load.

Although some embodiments of the present invention have been described, it shall be appreciated by anyone of ordinary skill in the art to which the present invention pertains that a large number of permutations and modifications are possible without departing from the technical ideas and scopes of the present invention that are disclosed in the appended claims.

What is claimed is:

1. A fuel preprocess system for a coal combustion boiler, the fuel preprocess system drying biomass or refuse-derived fuel, the fuel preprocess system comprising:
    a dryer configured to dry the biomass or refuse-derived fuel by use of flue gas generated after combustion in the boiler;
    a first dispersion plate placed in the dryer and configured to supply and disperse the flue gas to the dryer;
    a first cyclone configured to separate dried fuel into the flue gas;
    a torrefier configured to devolatilize a fibrous component contained in the dried fuel from the fuel dried in the dryer by use of primary air that is heat-exchanged after the combustion in the boiler;
    a second dispersion plate placed in the torrefier and configured to supply the primary air to inside of the torrefier;
    a first loop chamber placed between the first cyclone and the torrefier and configured to temporarily store the fuel separated from the first cyclone and to supply the fuel to the torrefier;
    a second cyclone configured to separate the fuel from which a fibrous component is devolatilized through a torrefaction process into flue gas and fuel;
    a fuel storage configured to store the fuel from which the fibrous component is devolatilized in the torrefier through the torrefaction process; and
    a third loop chamber placed between the torrefier and the fuel storage and configured to temporarily store the fuel separated from the second cyclone and then supply the fuel to the fuel storage.

2. The fuel preprocess system for a coal combustion boiler of claim 1, wherein the temperature of the primary air used in the torrefier is higher than the temperature of the flue gas used for drying in the dryer.

3. The fuel preprocess system for a coal combustion boiler of claim 1, wherein the dryer uses the flue gas that does not contain ashes as a heat source, and the flue gas used for drying in the dryer is discharged to the air by being injected to a flue gas duct of a coal combustion boiler system.

4. The fuel preprocess system for a coal combustion boiler of claim 1, wherein the primary air used as the heat source in the torrefier is used as combustion air of the boiler by being injected to a coal combustion burner included in the boiler.

5. The fuel preprocess system for a coal combustion boiler of claim 1, wherein the dryer further comprises a fluidized bed dryer.

* * * * *